United States Patent
Lindskog et al.

(10) Patent No.: US 7,272,192 B2
(45) Date of Patent: Sep. 18, 2007

(54) TIME-REVERSAL BLOCK TRANSMIT DIVERSITY SYSTEM FOR CHANNELS WITH INTERSYMBOL INTERFERENCE AND METHOD

(75) Inventors: Erik D. Lindskog, Sunnyvale, CA (US); Arogyaswami J. Paulraj, Stanford, CA (US)

(73) Assignee: Board of Trustees of the Leland Stanford Junior University, Palo Alto, CA (US)

( * ) Notice: Subject to any disclaimer, the term of this patent is extended or adjusted under 35 U.S.C. 154(b) by 732 days.

(21) Appl. No.: 09/833,543

(22) Filed: Apr. 11, 2001

(65) Prior Publication Data

US 2004/0013211 A1    Jan. 22, 2004

Related U.S. Application Data

(60) Provisional application No. 60/197,306, filed on Apr. 14, 2000.

(51) Int. Cl.
*H04L 23/02* (2006.01)
*H04L 5/12* (2006.01)

(52) U.S. Cl. ............... 375/264; 375/267; 375/299; 370/487

(58) Field of Classification Search ........... 375/347, 375/284, 260, 208, 224, 267, 299, 265, 332, 375/233, 229, 231, 346, 264; 455/562.1, 455/101, 562; 386/95; 342/189; 370/487, 370/490
See application file for complete search history.

(56) References Cited

U.S. PATENT DOCUMENTS 4,733,402 A * 3/1988 Monsen ............... 375/347
6,128,351 A * 10/2000 Jones et al. ............ 375/284
6,185,258 B1 * 2/2001 Alamouti et al. ........ 375/260
6,211,815 B1  4/2001 Richey et al.

(Continued)

FOREIGN PATENT DOCUMENTS

EP    0993130 A2    10/1999

(Continued)

OTHER PUBLICATIONS

Ariyavisitakul, "A Decision Feedback Equalizer with Time-Reversal Structure", IEEE Journal on selected area in communications, vol. 10, No. 3, Apr. 1992.*

(Continued)

*Primary Examiner*—Chen M. Fan
*Assistant Examiner*—Ted M. Wang
(74) *Attorney, Agent, or Firm*—Perkins Coie LLP

(57) ABSTRACT

A method for diversity transmission and reception for channels with intersymbol interference is created. With this method one can transmit from two or more antennas in such a way that a receiver with one or more antennas can benefit from the diversity offered by the difference in channels from the transmit antennas to the receiver antenna(s). The way the transmission and reception is organized makes it relatively simple to in the receiver detect the transmitted symbols despite intersymbol interference in the channel. Due to the increased diversity experienced by the receiver the average power level required at the receiver is reduced which can be used to increase the capacity or coverage of a wireless network and/or reduce the required transmitted power.

23 Claims, 3 Drawing Sheets

U.S. PATENT DOCUMENTS 6,594,226 B1 * 7/2003 Benning et al. ............ 370/208
6,697,641 B1 * 2/2004 Shapira ................... 455/562.1

FOREIGN PATENT DOCUMENTS

| JP | 10-190614 | 7/1998 |
| JP | 10-190614 A | 7/1998 |
| WO | WO99/14871 | 3/1999 |
| WO | 00/14921 | 3/2000 |

OTHER PUBLICATIONS

Lindskog, E. et al., "A Tansmit Diversity Scheme for Channels with Intersymbol Interference", IEEE, 2000 (307-311).

Ariyavisitakul, S., "A Decision-Feedback Equalizer With Selective Time-Reversal Operation For High-Rate Indoor Radio Communication", IEEE, 1990, (2035-2039).

Alamouti, S., "A Simple Transmit Diversity Technique For Wireless Communications," *Journal On Select Areas In Communications,* vol. 16, No. 8, Oct. 1998, pp. 1451-1458.

Wittneben, A., "Basestation Modulation Diversity For Digital Simulcast," *ABB Corporate Research, IEEE,* 1991, pp. 848-853.

Lindskog, E., "Multi-Channel Maximum Likelihood Sequence Estimation," *IEEE,* 1997, pp. 715-719.

Viterbi, A., "Error Bounds For Convolutional Codes And An Asymptotically Optimum Decoding Algorithm," *Transactions On Information Theory,* IEEE, Apr. 1967, pp. 260-269.

* cited by examiner

| $r_1(0)$ | $r_2(0)$ | $r_1(1)$ | $r_2(1)$ | ... | $r_1(N)$ | $r_2(N)$ |

| $r_1(0)$ | $r_1(1)$ | ... | $r_1(N)$ |

| $r_2(N)$ | $r_2(N-1)$ | ... | $r_2(0)$ |

TIME-REVERSAL BLOCK TRANSMIT DIVERSITY SYSTEM FOR CHANNELS WITH INTERSYMBOL INTERFERENCE AND METHOD

RELATED APPLICATION

This application claims the benefit of U.S. Provisional Application No. 60/197,306 filed Apr. 14, 2000.

FIELD OF THE INVENTION

The present invention relates, in general, to techniques that reduce the effects of fading in wireless communication systems, and more particularly to techniques which reduce the variation in signal strength of the received signal, while still effectively handling intersymbol interference.

BACKGROUND OF THE INVENTION

Sending a signal in the form of symbols transmitted at radio frequencies is one way of sending information. Several problems exist with this approach. A wireless communication channel typically experiences fading, i.e. the received signal strength varies with time and the position of the receiver and/or the transmitter. Further, a wireless communication channel often suffers from intersymbol interference, i.e. super-positioning of delayed versions of the transmitted symbol sequence. Intersymbol interference arises, for example, when a receiver picks up delayed versions of a single transmission. Buildings, mountains and other objects create delayed copies of a signal when a transmission reflects off the surface of the object and arrives at the receiver later than a version having fewer or no reflections before arriving at the receiver. The spread in time between the different copies of a signal is called the delay spread. The delay spread results in multiple overlaid copies of the signal with different amplitudes, phases and delays. The multiple copies interfere with the intended signal transmission, becoming noise and causing signal disruption.

Another problem with wireless communication is that the variation in signal strength at a receiver typically requires the system to be designed to transmit with higher power than would be necessary if the signal strength was constant, or if it varied less. This typically reduces the capacity of the system.

S. M. Alamouti [1.2] proposes a method of overcoming this limitation. He provides a two-branch transmit diversity scheme in which two transmit antennas and one receive antenna provide the same diversity as can be achieved with one transmit antenna and two receive antennas. This means that the same reduction in the variation of the quality of the received signal that can be achieved with two receive antennas can instead be realized with two transmit antennas. In the case of a cellular wireless system with base stations and subscriber units, the variability on both the uplink and the downlink can be combated with only multiple antennas at the base station, rather than at the subscriber unit, where it is costly and cumbersome to have multiple antennas.

A problem with the S. M. Alamouti two-branch transmit diversity scheme is that it does not effectively handle intersymbol interference in the channel. When a channel suffers from intersymbol interference, multiple versions of the original symbol sequence are received with different delays making the detection of the symbol sequence more difficult. Intersymbol interference can be caused by multiple propagation paths with different delays or by the use of transmission pulse shaping that extends over more than one symbol interval, or by the receive filter. The transmission pulse shaping and the receive filter is considered to be part of the channel. When there is intersymbol interference in the channel, the S. M. Alamouti scheme loses some of its good properties. More specifically, because of the intersymbol interference in the channel the receiver cannot be realized in the simple form described by S. M. Alamouti. Instead a considerably more complex receiver is be required. This dramatically reduces the usefulness of the scheme for channels with intersymbol interference.

What is needed is a system and method of transmit diversity that enables a transmitter to provide a better signal with less power while still handling intersymbol interference effectively with a relatively simple receiver.

SUMMARY OF THE INVENTION

The invention overcomes the identified limitations and provides a system and method for transmit diversity in channels with intersymbol interference. We call the method time-reversal space-time block coding. The system and method reduces the variability of the quality of the signal received by the receiver with a relatively simple receiver algorithm, even for channels with intersymbol interference. Applying transmit delay diversity in two or more groups of antennas is another embodiment of the invention which further increases the number of channels used in the delay diversity scheme, and further reduces the variability in the quality of the received signal.

The invention relates to a method of reducing the variability in the signal level applicable to channels with intersymbol interference in a system for processing and transmitting a signal where the signal comprises a plurality of symbols. The system comprises a first and a second spaced antenna coupled to a transmitter. In one example, the method of reducing the variability in the signal level comprises the following steps. Divide the symbols of the signal into a first and a second symbol stream wherein the first and second symbol streams each have at least two symbols. Divide a transmission frame into a first and a second transmission block. Transmit the first symbol stream from the first antenna during the first transmission block and transmit the second symbol stream from the second antenna during the second transmission block. Time reverse, take the complex conjugate form of and negate the second symbol stream. Time reverse and take the complex conjugate form of the first symbol stream. Transmit from the first antenna during the second transmission block the second symbol stream in the time reversed, complex conjugate and negated form, and transmit from the second antenna the first symbol stream in the time reversed and complex conjugate form.

The invention, in another embodiment, relates to a method of transmitting a signal of the type comprising a sequence of symbols over spaced antennas, or antennas of different polarization, to reduce fading and intersymbol interference, comprising the steps of: (1) dividing the sequence of symbols into two sequences, (2) dividing the transmission frame into two blocks, (3) processing the symbols in said two sequences so that some of the symbols in at least one of the sequences are time reversed, some of the symbols in at least one of the sequences are complex conjugated, some of the symbols in at least one of the sequences are negated, and, (4) during one of the blocks of the transmission frame, applying one processed symbol sequence to a first antenna and the other processed signal sequence to a second antenna, and during the other block of the transmission frame applying the other processed symbol sequence to the first antenna and the one processed symbol sequence to the second antenna.

In a further embodiment, the invention relates to a method of receiving symbol sequences transmitted in transmission frames having two blocks over spaced antennas, or antennas with different polarization in which the symbol sequence which is transmitted is divided into two sequences, some of the symbols in at least one of the two sequences are time reversed, some are complex conjugated and some are negated and, during one of the blocks of the transmission frame, one processed symbol sequence is transmitted over the first antenna, and the other over the second antenna and, during the other block, the other symbol sequence is transmitted over the second antenna, and the one over the second antenna. Said receiver receiving the symbol streams in the first and second blocks of the transmission frames and time reversing and taking the complex conjugate form of the symbol stream in the second block and filtering the symbol stream in the first block and the time reversed complex conjugate of the symbol streams in the second block to form decoupled outputs.

The principles of this invention are also applicable to arrangements with more than one receive antenna. The multiple receive antennas can for example be used to combine the signal in order to improve the signal to noise ratio in the signal and suppress interference. The generalization of the receiver processing to more than one receiving antenna can be done with well known methods.

DESCRIPTION OF THE DRAWINGS

The foregoing and other objects of the present invention will be more clearly understood from the following description when read in connection with the accompanying drawings in which.

GENERAL DESCRIPTION OF INVENTION

Figure 1:
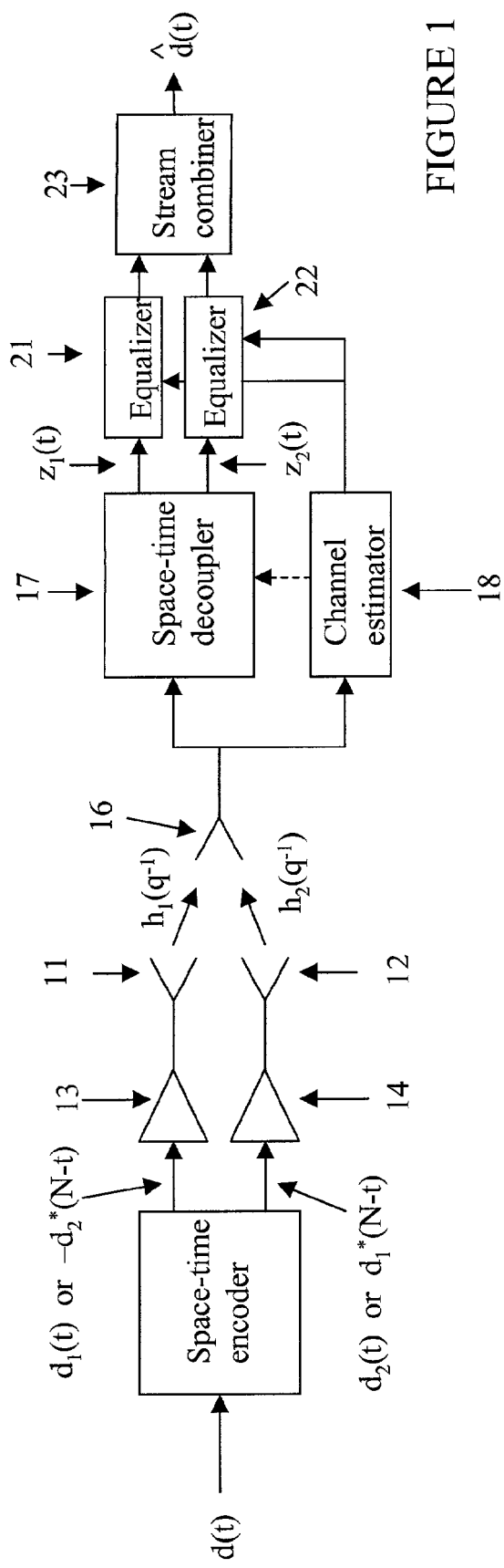
FIG. 1 is a schematic diagram of a time-reversal block transmit diversity system in accordance with the present invention.

The invention will be generally described with reference to FIG. 1. A symbol stream $d(t)$ to be transmitted during a frame in the communication system is fed into a space-time encoder. The space-time encoder divides the symbol stream $d(t)$ into two symbol streams, $d_1(t)$ and $d_2(t)$, each containing half the symbols. The transmission frame is also divided into two blocks. The space-time encoder provides input to two radio transmitters 13 and 14 connected to two antennas 11 and 12. In the transmitters 13 and 14, the digital signals from the space-time encoder are converted to analog signals via a digital-to-analog converter and upconverted to radio frequency. In one embodiment of the invention the space-time encoder transmits symbol stream $d_1(t)$ from antenna 11 during a first block of the transmission frame and transmits symbol stream $d_2(t)$ from the antenna 12. In a second block of the transmission frame, the space-time encoder transmits symbol stream $d_2(t)$ time-reversed, complex conjugated and negated from antenna 11 and symbol stream $d_1(t)$ is transmitted time-reversed and complex conjugated from antenna 12.

In the receiver, the signal is received by an antenna 16 and downconverted to baseband and digitized using well known methods. The digital signal is then fed into a space-time decoupler 17 and a channel estimator 18. Preferably some of the transmitted symbols are known. The channel estimator can then use the knowledge of these symbols value to estimate the channels between the two transmit antennas and the receiving antenna. These channel estimates are fed to the space-time decoupler which filters the received signal in such a way that two decoupled outputs, $z_1(t)$ and $z_2(t)$, are formed. These outputs are decoupled in the sense that $z_1(t)$ depends on $d_1(t)$ but not on $d_2(t)$ and $z_2(t)$ depends on $d_2(t)$ but not on $d_1(t)$. The signals $z_1(t)$ and $z_2(t)$ still suffer from intersymbol interference due to the delay spread in the propagation channel and/or partial response modulation in the transmitter and/or delay spread in the receive filter. However, since the signals $z_1(t)$ and $Z_2(t)$ each only depend on one stream of symbols and not two, the estimation of the symbol streams $d_1(t)$ and $d_2(t)$ is much simpler than if $z_1(t)$ and $z_2(t)$ would depend on two symbols streams each. This is an important part of this invention. The equalization of the intersymbol interference in $z_1(t)$ and $z_2(t)$ to detect $d_1(t)$ and $d_2(t)$, respectively, can be performed with a maximum likelihood sequence estimator. Other equalizers or detectors that can be used are for example linear equalizers and decision feedback equalizers and different variations of all of these detectors. Detectors 21 and 22 can use the channel estimates from the channel estimator for the purpose of their tuning. After the symbol streams $d_1(t)$ and $d_2(t)$ have been detected they are combined at stream combiner 23 to form an estimate of the originally transmitted symbol stream, $d(t)$.

It is possible to make simple modifications and enhancements to the method presented here without departing from the spirit of this invention. For example, it is possible to have different arrangements of the symbols in different number of streams and it is possible to divide a transmission frame into a different number of blocks, it is possible to apply the time-reversal, complex conjugation and negation in different fashions to these blocks while still achieving the same final goal, namely transmitting from multiple antennas in such a way that the receiver can recover the spatial diversity in a simple way even in the presence of intersymbol interference in the channel.

It is also possible to formulate the detection of the symbols differently in the receiver without departing from the spirit of the invention. For example, in the receiver, one will want to utilize the fact that with proper combining and filtering or arrangement of the computations, the detection of the symbol streams $d_1(t)$ and $d_2(t)$ effectively decouple into two separate detections of the symbol streams $d_1(t)$ and $d_2(t)$. In order to do this, the spirit of the invention must be utilized.

Another distinctive feature of this invention that can be realized, also with small modifications to how the transmission and reception is being performed, is the feature of transmitting in such a way and processing and filtering the received signal in such a way that multiple signal streams are produced, each of them effectively being a filtered version of a single symbol stream of symbol. This facilitates the mitigation of the intersymbol interference in the channel.

Another feature of this invention is how to signal over a channel such that the effective experienced channel is a time-reversed version of the actual channel. How this is performed is described in the detailed description of the invention. The ability to signal such that the time-reversed channel is experienced is important in order to handle intersymbol interference effectively when transmitting from multiple antennas to take advantage of diversity.

DETAILED DESCRIPTION OF THE INVENTION

Throughout this description, we will consider discrete-time channel models and detectors. A discrete-time filter will be represented as a polynomial in the unit delay operator, $q^{-1}$, as exemplified below:

$$v(t) = a(q^{-1})u(t) = (a_0 + a_1 q^{-1} + \cdots + a_{na} q^{-na})u(t)$$
$$= a_0 u(t) + a_1 u(t-1) + \cdots + a_{na} u(t-na),$$

where na is the order of the polynomial $a(q^{-1})$, representing a filter with na+1 taps. The discrete time is denoted with the discrete variable t. Note that filters may also be non-causal and have terms with powers of the unit advance operator q.

Multiple-input-single-output (MISO) filters will be represented as polynomial row vectors, and single-input-multiple-output (SIMO) filters will be represented as polynomial column vectors. Multiple-input-multiple-output (MIMO) filters will be represented as polynomial matrices.

The complex conjugate of a filter $a(q^{-1})$ is defined as $$(a(q^{-1}))^* \triangleq a^*(q) = a_0^* + a_1^* q + \ldots + a_{na}^* q^{na}. \quad (1)$$

Note that the resulting filter is anti-causal.

Correspondingly, the complex conjugate transpose of a MISO, SIMO or MIMO filter is the transpose of the filter with all filter elements complex conjugated according to (1).

Figure 2:
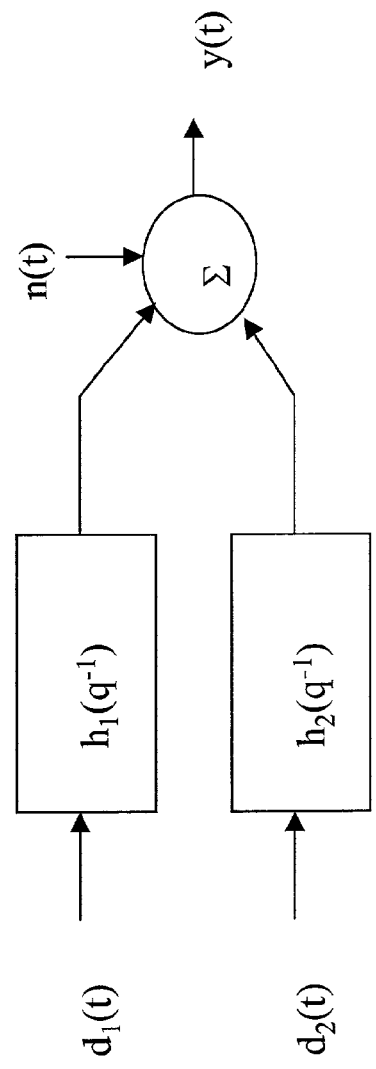
FIG. 2 is a channel model for two transmit antennas and a receive antenna.

The discrete-time model of a channel with two transmit antennas and one receive antenna is given by $$y(t) = h_1(q^{-1})d_1(t) + h_2(q^{-1})d_2(t) + n(t) \quad (2)$$
$$= (h_{10} + \ldots + h_{1,nh_1-1}q^{-nh_1+1})d_1(t) +$$
$$(h_{20} + \ldots + h_{2,nh_2-1}q^{-nh_2+1})d_2(t) + n(t),$$

where (2), y(t) is the received signal, $d_1(t)$ and $d_2(t)$ are the symbol sequences transmitted from antenna 11 and antenna 12 respectively, and $h_1(q^{-1})$ and $h_2(q^{-1})$ are the channels for antenna 11 and antenna 12 respectively. The additive noise is modeled by n(t). We will in this description assume that the noise is white with variance $\sigma_n^2$. See FIG. 2. The channel is assumed to be fading but to be approximately stationary over a block of symbols. Note that the pulse shape used in the modulation and the receive filter is part of the overall channel modeled in (2).

The invention here is described in terms of complex baseband processing in digital form. It is assumed that there are digital-to-analog converters that convert the digital baseband signals to be transmitted into analog signals that in turn are upconverted to radio frequency with radios using well known methods. These radio signals are then transmitted from antennas over the radio channel. Correspondingly it is assumed that the radio signals are received by antenna(s) and downconverted with radios using well known methods to an analog signals at baseband. This signal is then sampled and converted into a complex digital baseband signals using analog-to-digital converters.

A. Channel Without Intersymbol Interference

Let us for a moment assume that the channel has no delay spread and that we do not use partial response modulation. Thus, without any intersymbol interference the channels have only a single tap each, i.e.

$$h_1(q^{-1}) = h_1 \text{ and } h_2(q^{-1}) = h_2. \quad (3)$$

In the scheme presented by Alamouti in [1, 2], the original symbol stream, d(t), is divided into two separate symbol streams, $d_1(t)$ and $d_2(t)$. These two symbol streams are then transmitted on antenna 11 and antenna 12 such that every "even" sample the signal, $$r_1(t) = h_1 d_1(t) + h_2 d_2(t) + n_1(t), \quad (4)$$

is received. That is, $d_1(t)$ is transmitted from antenna 11 and $d_2(t)$ is transmitted from antenna 12. The noise $n_1(t)$ represents the corresponding even noise samples. Every "odd" sample the symbol streams are transmitted such that the signal, $$r'_2(t) = h_2 d_1^*(t) - h_1 d_2^*(t) + n'_2(t), \quad (5)$$

is received at the receiver. That is, $d_1^*(t)$ is transmitted from antenna 12 and $-d_2^*(t)$ is transmitted from antenna 11. The noise $n_2'(t)$ represents the corresponding odd noise samples. The received odd signal samples are then complex conjugated giving the signal $$r_2(t) = (r'_2(t))^* = h_2^* d_1(t) - h_1^* d_2(t) + n_2(t) \quad (6)$$

If we introduce the vectors $$r = \begin{bmatrix} r_1(t) \\ r_2(t) \end{bmatrix}, \quad d(t) = \begin{bmatrix} d_1(t) \\ d_2(t) \end{bmatrix}, \quad (7)$$

$$n(t) = \begin{bmatrix} n_1(t) \\ n_2(t) \end{bmatrix} = \begin{bmatrix} n_1(t) \\ (n'_2(t))^* \end{bmatrix} \quad (8)$$

and the matrix (9)

$$H = \begin{bmatrix} h_1 & h_2 \\ h_2^* & -h_1^* \end{bmatrix},$$

we can express the transmission from the two symbol streams $d_1(t)$ and $d_2(t)$ to the received sequences $r_1(t)$ and $r_2(t)$ as $$r(t) = Hd + n(t). \quad (10)$$

Note that the "channel matrix" H is orthogonal such that $$H^H H = (|h_1|^2 + |h_2|^2)I. \quad (11)$$

In [1, 2], Alamouti proposes to multiply r(t) with $H^H$ in the receiver to obtain the signal $$z(t) = H^H r(t) = H^H H d(t) + H^H n(t) \quad (12)$$
$$= (|h_1|^2 + |h_2|^2)d(t) + v(t),$$

-continued $$\upsilon(t) = \begin{bmatrix} \upsilon_1(t) \\ \upsilon_2(t) \end{bmatrix} = H^H n(t). \quad (13)$$

Note that $H^H$ is in fact the matched filter and that $z(t)$ in (12) is the matched filter output.

Using the components of $z(t)=[z_1(t)z_2(t)]^T$, we can express (12) as $$z_1(t)=(|h_1|^2+|h_2|^2)d_1(t)+\upsilon_1(t) \quad (14)$$

$$z_2(t)=(|h_1|^2+|h_2|^2)d_2(t)+\upsilon_2(t). \quad (15)$$

Using (11), we can compute the covariance of the noise vector $\upsilon(t)=[\upsilon_1(t)\upsilon_2(t)]^T$ as $$R_{\upsilon\upsilon} = E[\upsilon(t)\upsilon^H(t)] = H^H R_{nn} H \quad (16)$$

$$= \sigma_n^2 H^H H = \sigma_n^2(|h_1|^2 + |h_2|^2)I,$$

In the third equality we have used the fact that n(t) is a white vector noise sequence with the covariance $R_{nn}=\sigma_n^2 I$. Since $R_{\upsilon\upsilon}$ is diagonal, $\upsilon_1(t)$ and $\upsilon_2(t)$ are uncorrelated.

The matched filter outputs, $z_1(t)$ and $z_2(t)$, can obviously after proper scaling and slicing be used independently to estimate the transmitted symbols $d_1(t)$ and $d_2(t)$ respectively. The reason for this simplified decoupled detection is of course that the channel matrix H is orthogonal and thus $H^H H$ is diagonal. The detection of the two symbol streams, $d_1(t)$ and $d_2(t)$, thus decouples making the detection very easy. Further, since $\upsilon_1(t)$ and $\upsilon_2(t)$ are uncorrelated, no gain can be achieved by joint detection of the two symbol streams.

If we had one transmit antenna and two receive antennas the corresponding matched filter output would be $$z(t)=(|h_1|^2+|h_2|^2)d(t)+\upsilon(t) \quad (17)$$

We can thus see that the matched filter output in (12), using two transmit and one receive antenna, experiences the same diversity benefit as when using one transmit and two receive antennas[1]. This was shown by Alamouti [1, 2].

[1]However, unless we know the channel when transmitting, we cannot achieve the gain from coherent combining.

Figures 3, 4, 5:
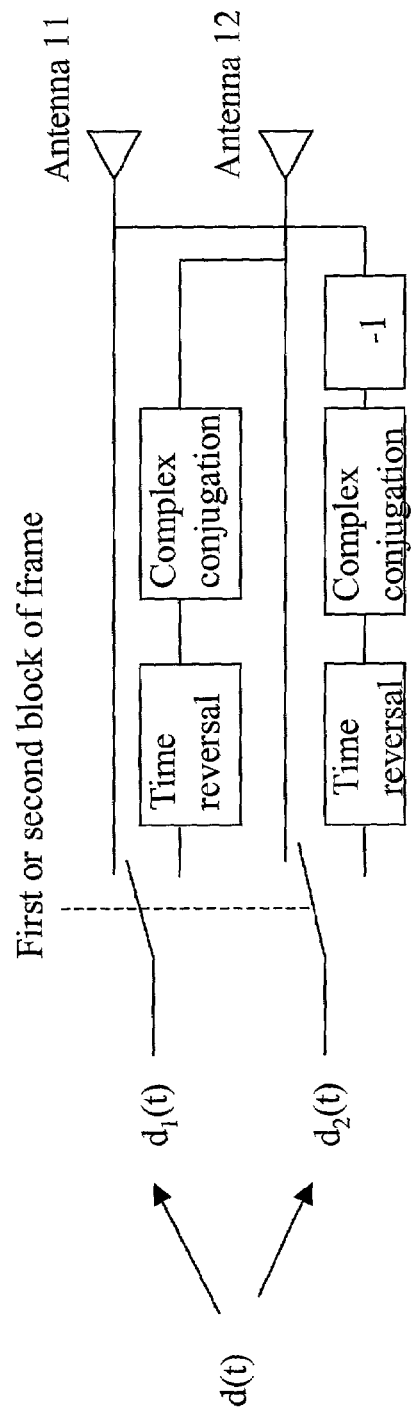
FIG. 3 illustrates the received signal after complex conjugation of $r'_2(t)$ in the transmit diversity scheme for channels without symbol interference.
FIG. 4 illustrates the received signal after manipulation in the transmit diversity scheme for channels with intersymbol interference.
FIG. 5 is a schematic view of the transmission in the transmit diversity scheme for channels with intersymbol interference.

The received signals after complex conjugation of $r_2'(t)$ in the transmit diversity scheme for channel without intersymbol interference is shown in FIG. 3.

B. Channel with Intersymbol Interference

Let us now return to our original channel model in (2) with intersymbol interference. With the proper substitutions and manipulations we can derive the counterpart of the scheme by Alamouti [1, 2] for a channel with intersymbol interference. This derivation is however not trivial.

Assume that we transmit in such a way that the received signal has the form $$r(t) = H(q, q^{-1})d(t) + n(t), \quad (18)$$

where (19)

$$H = \begin{bmatrix} h_1(q^{-1}) & h_2(q^{-1}) \\ h_2^*(q) & -h_1^*(q) \end{bmatrix}.$$

The noise vector n(t) is the noise after the necessary manipulation in the receiver which will be explained below. It will be white with the covariance $R_{nn}=\sigma_n^2 I$. Note that the channels $h_2^*(q)$ and $h_1^*(q)$ have complex conjugated coefficients and are time reversed and thus anti-causal. We will see below how this signalling can be achieved.

The polynomial channel matrix $H(q,q^{-1})$ is also here orthogonal in the sense that $$H^H(q,q^{-1})H(q,q^{-1})=(h_1^*(q)h_1(q^{-1})+h_2^*(q)h_2(q^{-1}))I.$$

In the receiver we now filter this signal with the matched filter $H^H(q,q^{-1})$. The output from the matched filter is then given by $$z(t) = H^H(q, q^{-1})H(q, q^{-1})d(t) + H^H(q, q^{-1})n(t) \quad (20)$$
$$= (h_1^*(q)h_1(q^{-1}) + h_2^*(q)h_2(q^{-1}))d(t) + \upsilon(t),$$

where (21)

$$\upsilon(t) = \begin{bmatrix} \upsilon_1(t) \\ \upsilon_2(t) \end{bmatrix} = H^H(q, q^{-1})n(t).$$

Using the components of $z(t)=[z_1(t)z_2(t)]^T$, we can express (20) as $$z_1(t)=(h_1^*(q)h_1(q^{-1})+h_2^*(q)h_2(q^{-1}))d_1(t)+\upsilon_1(t) \quad (22)$$

$$z_2(t)=(h_1^*(q)h_1(q^{-1})+h_2^*(q)h_2(q^{-1}))d_2(t)+\upsilon_2(t). \quad (23)$$

Similar to (16), the noise sequences $\upsilon_1(t)$ and $\upsilon_2(t)$ are uncorrelated as the spectrum[2] of $\upsilon(t)$ given by $$R_{\upsilon\upsilon}(q, q^{-1}) = \sum_{m=-\infty}^{\infty} E[\upsilon(t)\upsilon^H(t-m)]q^{-m} \quad (24)$$
$$= H^H(q, q^{-1})R_{nn}(q, q^{-1})H(q, q^{-1})$$
$$= \sigma_n^2 H^H(q, q^{-1})H(q, q^{-1})$$
$$= \sigma_n^2(h_1^*(q)h_1(q^{-1}) + h_2^*(q)h_2(q^{-1}))I$$

has no cross terms between $\upsilon_1(t)$ and $\upsilon_2(t)$. In the third equality we have used the fact that n(t) is a white vector noise sequence with $R_{nn}(q,q^{-1})=\sigma_n^2 I$.

[2]We have here replaced z in the spectrum with q to simplify the notation. See [3].

The problem of detecting the symbol streams $d_1(t)$ and $d_2(t)$ thus decouples. Furthermore, the channel after matched filtering is the same as one would obtain when using one transmit antenna and two receive antennas. This scheme thus, similar to the case without intersymbol interference, obtains the same diversity benefit as one can achieve using one transmit and two receive antennas. It thus achieves full diversity. The intersymbol interference of course still has to be handled by an equalizer. The output from the matched filter is however exactly the signal to be processed by a maximum likelihood sequence estimator utilizing the matched filter metric. See for example [4, 3]. Again it should be noted that, as for the case without intersymbol interference, the gain from coherent combining obtained when using two receive antennas is not reproduced when using two transmit antennas and one receive antenna.

When using an MLSE, the estimated symbol sequence, $\hat{d}_1(t)$, will be the symbol sequence that maximizes the recursively defined matched filter metric [4, 3]

$$\mu_{MF}(t) = \mu_{MF}(t-1) + \text{Re}\{d_1^*(t)(2z_1(t) - \gamma_0 d_1(t) - 2\sum_{m=1}^{n\gamma} \gamma_m d_1(t-m))\}. \quad (25)$$

In (25), $\gamma_k$ are the coefficients of the double sided complex conjugate symmetric metric polynomial $$\gamma(q, q^{-1}) = \gamma_{n\gamma}^* q^{n\gamma} + \ldots + \gamma_0 + \ldots + \gamma_{n\gamma} q^{-n\gamma} = h_1^*(q) h_1(q^{-1}) + h_2^*(q) h_2(q^{-1}). \quad (26)$$

Preferably, the maximizing sequence is found using the Viterbi algorithm[3] [5]. The estimated symbol sequence $\hat{d}_2(t)$ is similarly formed by maximizing the corresponding metric utilizing the second component, $z_2(t)$, of $z(t)$.

[3] In order to save computations, various suboptimal schemes can also be used.

In order for the symbol detector in the receiver to work properly it has to be adapted to the channel. One way of doing this is to estimate the channel using the known transmitted symbols. This estimation of the channel can be performed in many different ways using well known methods. One method of estimating the channel is to estimate the polynomials $h_1(q^{-1})$ and $h_2(q^{-1})$ that best model the part of the received signal that correspond to the known transmitted symbols. This approach is well known and is only one of the examples of how channel estimation can be performed. In the symbol detector described here the maximum likelihood sequence detector using the metric in (25), one need to estimate the channel polynomials $h_1(q^{-1})$ and $h_2(q^{-1})$ and use them to form the metric polynomial in (26), whos coefficients are used in the maximum likelihood sequence detector metric in (25).

C. Anti-causal Signalling

Consider the components $r_1(t)$ and $r_2(t)$ of the vector signal $r(t)=[r_1(t)\ r_2(t)]^T$:

$$r_1(t) = h_1(q^{-1})d_1(t) + h_2(q^{-1})d_2(t) + n_1(t) \quad (27)$$

$$r_2(t) = h_2^*(q)d_1(t) - h_1^*(q)d_2(t) + n_2(t). \quad (28)$$

To receive $r_1(t)$ we simply transmit the symbol stream $d_1(t)$ from antenna 11 and symbol stream $d_2(t)$ from antenna 12. However, since there is intersymbol interference in the channel we cannot transmit such as to receive $r_1(t)$ and $r_2(t)$ in alternating symbol intervals. We have to transmit such as to receive a longer sequence of $r_1(t)$, and a longer sequence of $r_2(t)$. We will describe this in more detail below.

Achieving $r_2(t)$ at the receiver is less straightforward but nonetheless possible. Consider the two symbol streams $d_1(t)$ and $d_2(t)$. Let us choose their length to be N+1. Time reverse these symbol streams to form the new symbol streams $$\tilde{d}_1(t) = d_1(N-t),\ t=0, 1, \ldots, N \quad (29)$$

$$\tilde{d}_2(t) = d_2(N-t),\ t=0, 1, \ldots, N. \quad (30)$$

Now transmit $-\tilde{d}_2^*(t)$ from antenna 11 and $\tilde{d}_1^*(t)$ from antenna 12. The signal at the receiver will then be $$r_2'(t) = h_2(q^{-1})\tilde{d}_1^*(t) - h_1(q^{-1})\tilde{d}_2^*(t) + n(t) \quad (31)$$

By time reversing $r_2'(t)$ in (31) and complex conjugating it we obtain the signal $$(r_2'(N-t))^* = h_2^*(q)d_1(t) - h_1^*(q)d_2(t) + n_2(t), \quad (32)$$

where we have denoted $n^*(N-t)$ with $n_2(t)$. Note that the signal in (32) is exactly the desired signal $r_2(t)$ in (28).

The received signal after manipulation in the transmit diversity scheme for channels with intersymbol interference is shown in FIG. 4.

The transmit diversity scheme can thus be summarized as follows. Divide a sequence of symbols, d(t), t=0, 1, . . . , 2N+2, into two sequences, $d_1(t)$, t=0, 1, 2, . . . , N and $d_2(t)$, t=0, 1, 2, . . . , N. This division of the symbol sequence d(t) into two symbol sequence can be made more or less arbitrary as long as there is an equal amount of symbols in each sequence $d_1(t)$ and $d_2(t)$ and the correlation between symbols in the sequences close to each other is not significantly effected. Also divide a transmission frame into two blocks. During the first block of the frame, transmit the sequence $d_1(t)$ from antenna one and the sequence $d_2(t)$ from antenna two. During the second block of the frame, transmit $d_2(t)$ time reversed and complex conjugated from antenna 11 and transmit $d_1(t)$ time reversed, complex conjugated and negated from antenna 12. The transmission procedure is depicted in FIG. 5.

Figure 6:
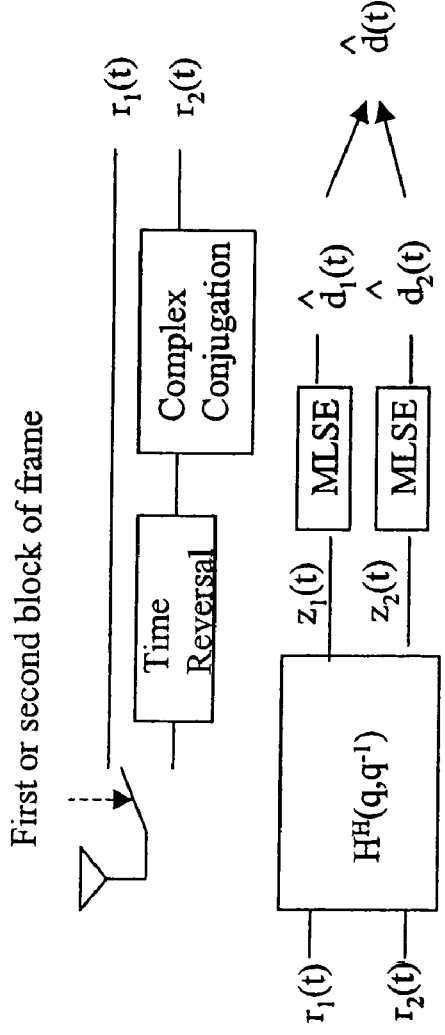
FIG. 6 is a schematic view of the symbol detection when using the transmit diversity scheme for channels with intersymbol interference.

On the receive side, during the first block of the frame, the samples are collected to form the sequence $r_1(t)$ and during the second block of the frame the samples are collected and the sequence is complex conjugated and time reversed in order to form the sequence $r_2(t)$. The sequences $r_1(t)$ and $r_2(t)$ are then fed into the MIMO matched filter $H^H(q,q^{-1})$ to form the decoupled outputs $z_1(t)$ and $z_2(t)$. The sequences $z_1(t)$ and $z_2(t)$ are then used independently to estimate the transmitted sequences $d_1(t)$ and $d_2(t)$. This detection can for example be performed with a maximum likelihood sequence estimator. The receive signal processing is schematically depicted in FIG. 6.

The way the symbols are transmitted and received, as described above, is a principal part of this invention. Especially important is the concept of time reversing the symbol streams when they are transmitted in the second block of the frame, and in the receiver time reversing the signal received during the second block of the frame. These time reversal operations is what enables the simple detection described in this invention. Without these time reversal operations, and the matched filtering described for the receiver, the detection of the two symbol streams, $d_1(t)$ and $d_2(t)$ does not decouple. There are many variations as to how the transmission and the reception can be arranged to achieve this effect. We can change which symbol sequence is being negated, which symbol streams are being complex conjugated and which symbol streams are being time reversed. Apart from changing the way in which the transmission is performed it will change the corresponding matched filter, $H^H(q,q^{-1})$, that is being applied in (20) in the receiver. All these are simple variations of this invention. The main principle is to arrange the transmission of the symbols in such a way that after they have passed through the channel and has been processed in the receiver as described in this invention, two outputs are produced that each depend only on one of the sequences, $d_1(t)$ or $d_2(t)$, and also is easy to equalize as described in this invention using, for example, a maximum likelihood sequence estimator.

A very important component of this invention is how to signal over a channel such that the effective experienced channel is a time-reversed version of the actual channel. We here describe the principle for how this can be achieved.

Assume that we have a time-discrete symbol stream $d(t)$, $t=1, 2, \ldots, N$ and a channel described by the polynomial $h(q^{-1})$. If we transmit the symbol stream $d(t)$ over the channel $h(q^{-1})$, sampling the received signal once per symbol interval, the sampled output in the receiver, $y(t)$, can be expressed as $$y(t)=h(q^{-1})d(t)+n(t) \quad (33)$$

where $n(t)$ is a term representing noise plus interference. Let us now assume that we want to form a signal, $\tilde{y}(t)$, of the form $$\tilde{y}(t)=h(q)d(t)+\upsilon(t) \quad (34)$$

where $\upsilon(t)$ is another representation of noise and interference and $h(q)$ is a time reversed version of $h(q^{-1})$, i.e. the delay operators, $q^{-1}$, in $h(q^{-1})$ are replaced by the advance operator $q$. In other words, if $$h(q^{-1})=h_0+h_1 q^{-1}+\ldots+h_{nh}q^{-nh} \quad (35)$$

then $$h(q)=h_0+h_1 q+\ldots+h_{nh}q^{nh}. \quad (36)$$

It is not trivial to signal with $d(t)$ over $h(q^{-1})$ in such a way that $\tilde{y}(t)$ is generated but it can be done as follows.

Take the symbol stream $d(t)$ and time-reverse it to form the time-reversed symbol stream $$\tilde{d}(t)=d(N+1-t), t=1, 2, \ldots, N. \quad (37)$$

Transmit $\tilde{d}(t)$ over the channel $h(q^{-1})$ such that the signal $$x(t)=h(q^{-1})\tilde{d}(t)+n'(t) \quad (38)$$

is received. Time reverse the signal $x(t)$ giving the desired signal $$\tilde{y}(t)=x(N+1-t), t=1, 2, \ldots, N. \quad (39)$$

Because $\tilde{y}(t)$ is a time-reversed version of $x(t)$ it can be expressed as in equation (34) and therefore is the signal we desire.

Due to the intersymbol interference the signalling suffers from some "edge effects". These can however be handled by insertion of known symbols in the beginning and end of each transmission block. Let us define the maximum delay in the channels as $$nh \triangleq \max(nh_1, nh_2). \quad (40)$$

The first nh samples of $r_1(t)$ will thus not conform with (27) and similarly the last nh of $r_2(t)$ will not conform with (28). The matched filter in the receiver (20), filters $r_1(t)$ with $h_1^*(q)$ or $h_2^*(q)$ and $r_2(t)$ with $h_2(q^{-1})$ or $-h_1(q^{-1})$. As a result the matched filter signal, $z(t)$, will only conform with (20) when $t \in [nh+1, N-nh]$.

In the beginning and the end of each of the $r_1$- and $r_2$-blocks, nh symbols can thus not be used in the simplified detection outlined in this description. This is however not a big problem. We will in any case need some training symbols in order to estimate the channels $h_1(q^{-1})$ and $h_2(q^{-1})$. We can thus put these training symbols in the beginning and the end of each of the $r_1$- and $r_2$-blocks, or more precisely, in the beginning and the end of the sequences $d_1(t)$ and $d_2(t)$, and thus also in the beginning and end of the sequences $-d_2^*(N-t)$ and $d_1^*(N-t)$. The training symbols at the end of the $r_1$-block and at the beginning of the $r_2$-block can always be combined to a longer training sequence. This is important since when estimating channels with intersymbol interference, the training sequence cannot be allowed to be too short. Further, extra training symbols can be inserted inbetween the end of the $r_1$-block and before the begining of the $r_2$-block.

Also, if this scheme is used in the transmission from a base station, then the receiving subscriber can potentially combine the training symbols at the end of an $r_2$-block with the beginning of an $r_1$-block to form yet another longer training sequence.

Figure 7:
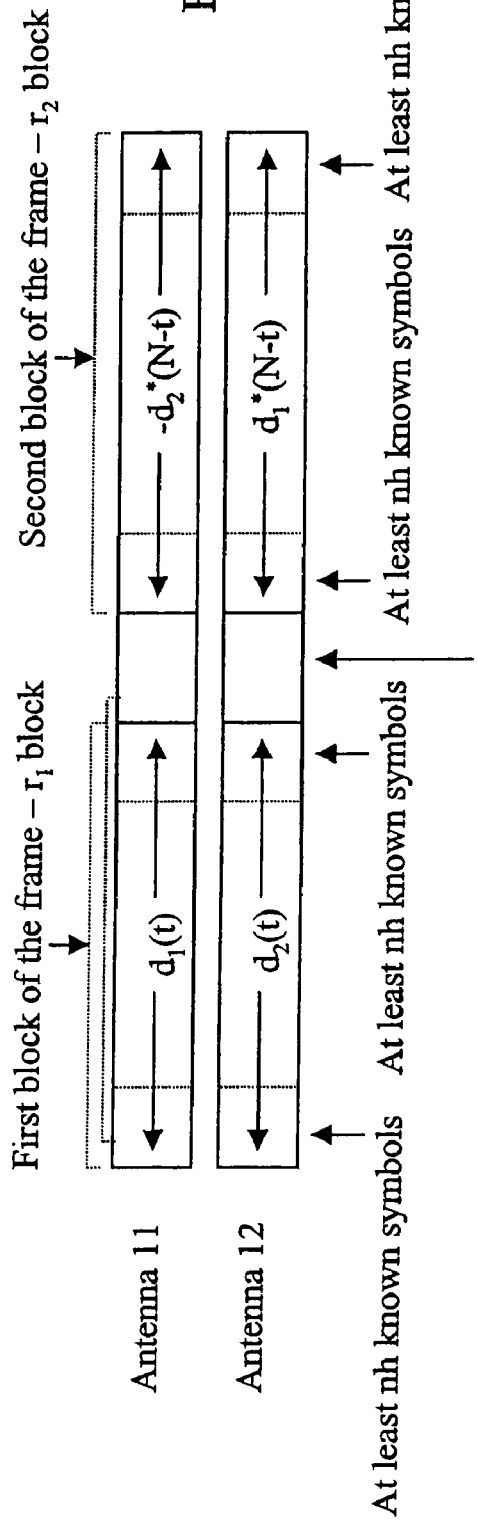
FIG. 7 illustrates the configuration of the training data and data transmitted by the antennas.

Note that all symbols, including the training symbols, transmitted in the $r_2$-block are time reversed compared to the corresponding symbols in the $r_1$-block. The training sequences in the $r_2$-block are thus time reversed compared to the training sequences in the $r_1$-block. The number of training symbols in the beginning and the end of the sequences $d_1(t)$ and $d_2(t)$ has to be at least equal to the maximum expected delay, nh, in symbol periods. FIG. 7 shows the configuration of training data and data. The upper row of data is transmitted from antenna 11 and the lower row is transmitted from antenna 12.

I. Combining With Transmit Delay Diversity

We will here call the method of transmit diversity described above 'time-reversal space-time block coding'. Since time-reversal space-time block coding can handle intersymbol interference, we can combine it with the well known method of transmit delay diversity [6]. In transmit delay diversity artificial delay spread is introduced in the channel by transmitting the same signal from two or more antennas with some delay between the transmissions from the different antennas. The delay between the antennas would typically be of the order of a symbol interval. This artificially introduced delay spread in the channel introduces diversity that can be exploited by the equalizer or sequence detector in the receiver. We can now combine transmit delay diversity with time-reversal space-time block coding as follows.

Let us divide a group of transmit antennas into two groups. Within the respective groups we use transmit delay diversity. We then view the two groups as two different channels and apply time-reversal space-time block coding to them. We thereby double the initial diversity that the transmit delay diversity achieved within each group. With more diversity the received signal level will vary even less and even less received power is required at the subscriber unit. This can be used to further increase the range of the system or further increase the capacity as less power can be transmitted from the base station, thus creating less interference and thus allowing more users in the system.

The combination of time-reversal space-time block coding with transmit delay diversity is a part of this invention.

A new transmit diversity scheme for channels with intersymbol interference, causing intersymbol interference, has been described. The intersymbol interference can be caused by partial response modulation or by delay spread in the propagation channel. This scheme shares many of the benefits of the transmit diversity scheme for channels without intersymbol interference presented in [1, 2]. It can however, as opposed to the scheme described in [1, 2] handle channels with intersymbol interference efficiently. This is very important as most practical wireless communication channels have some intersymbol interference from either partial response modulation in the transmitter or from delay spread in the propagation channel or from filtering in the receiver, or from all of these effects.

The detection of the symbol streams are decoupled, avoiding an unnecessarily complex detector. The scheme also achieves the same diversity benefit with two transmit antennas and one receive antenna as can be achieved with one transmit antenna and two receive antennas. The channel is required to be approximately stationary over a block of symbols. The size of this block is a design parameter.

Note that this scheme can be particularly useful in order to achieve transmit diversity when signalling with higher order constellations (e.g. QAM, 8PSK or 16QAM) as the complexity of the equalizer is not increased. If we attempt to achieve the same diversity by employing transmit delay diversity, then the equalizer may become substantially more complex. This especially applies if the receiver uses an MLSE or a suboptimal version thereof.

Since the method described above, which we here call time-reversal space-time block coding, can handle intersymbol interference, we can combine it with the well known method of transmit delay diversity [6]. We can divide a group of transmit antennas into two groups. Within the respective groups we can use transmit delay diversity. We then view the two groups as two different channels and apply time-reversal space-time block coding to them. We thereby double the initial diversity that the transmit delay diversity achieved within each group.

Both the time-reversal space-time block coding alone and the combination with transmit delay diversity increases the diversity in the transmission. This means that the receiver sees more, somewhat independently, fading signals and the probabillity that they all will have low power at the same time is reduced. With more diversity the received signal level will vary even less and even less received power is required at the subscriber unit. This can be used to increase the range of the system or increase the capacity as less power can be transmitted from the base station, thus creating less interference and thus allowing more users in the system. The so called fading margin in the transmission can then be reduced. This means that a lower mean power is required at the subscriber unit. This lower required mean power can either be used to increase the range of the transmission by keeping the transmitted power unchanged or increase the capacity of system by lowering the transmitted power and thereby reducing the interference such that more users can be allowed into the system. The lower required mean power can also be used to increase the data rate to the subscriber if different data rates are available.

The above described embodiments of the invention are, obviously, merely illustrative implementations of the principles of the invention and various modifications and enhancements can be introduced by artisans without departing from the spirit and scope of this invention, which is embodied in the following claims.

REFERENCES

[1] S. M. Alamouti, "A simple transmit diversity technique for wireless communications," *Journal of Selective Areas of Communications*, vol. 16, no. 8, pp. 1451–1458, October 1998.

[2] S. M. Alamouti, "Transmitter diversity technique for wireless communications,", International patent application PCT/US98/17963.

[3] E. Lindskog. *Space-time processing and equalization for wireless communications*, PhD thesis, Uppsala University, Signals and Systems, PO Box 528, 751 20 Uppsala, Sweden, 1999, See www.signal.uu.se.

[4] E. Lindskog, "Multi-channel maximum likelihood sequence estimation," in *Proceedings of the 47th IEEE Vehicular Technology Conference*, vol. 2, Phoenix, Ariz., USA, May 5–7, 1997, pp. 715–719.

[5] A. J. Viterbi, "Error bounds for convolutional codes and an asymptotically optimum decoding algorithm," *IEEE Transactions on Information Theory*, vol. 13, pp. 260–269, April 1967.

[6] A. Wittneben, "Base station modulation diversity for digital simulcast," in *Proceedings of the 41st Vehicular Technology Conference*, 1991.

What is claimed is:

1. A method of transmitting a signal of the type comprising a sequence of symbols over spaced antennas, or antennas of different polarization, to reduce fading and intersymbol interference, comprising the steps of:
    dividing a transmission frame into first and second blocks;
    processing the sequence of symbols to generate first, second, third, and fourth symbol sequences so that some of the symbols in at least one of the symbol sequences are time-reversed, some of the symbols in at least one of the symbol sequences are complex conjugated, and some of the symbols in at least one of the symbol sequences are negated, processing of the first symbol sequence comprises time reversing and complex conjugating the first symbol sequence to generate the third symbol sequence, and processing of the second symbol sequence comprises time reversing, complex conjugating and negating the second symbol sequence to generate the fourth symbol sequence, and;
    during the first block of the transmission frame, applying the first symbol sequence to a first antenna and the second symbol sequence to a second antenna and during the second block of the transmission frame applying the fourth symbol sequence to the first antenna and the third symbol sequence to the second antenna.

2. The method of claim 1 wherein processing the sequence of symbols comprises dividing the sequence of symbols to obtain the first and the second symbol sequences, processing the first symbol sequence to obtain the third symbol sequence, and processing the second symbol sequence to obtain the fourth symbol sequence.

3. A transmitter for transmitting signals of the type comprising a sequence of symbols over spaced antennas, or antennas of different polarization, to reduce fading while handling intersymbol interference efficiently, comprising:
    a processor for processing the sequence of symbols to generate first, second, third, and fourth symbol sequences so that some of the symbols in at least one of the symbol sequences are time-reversed, some of the symbols in at least one of the symbol sequences are complex conjugated, some of the symbols in at least one of the symbol sequences are negated, processing of the first symbol sequence comprises time reversing and complex conjugating the first symbol sequence to generate the third symbol sequence, and processing of the second symbol sequence comprises time reversing, complex conjugating and negating the second symbol sequence to generate the fourth symbol sequence, and;

means for applying during a first block of a transmission frame the first symbol sequence to a first antenna and the second symbol sequence to a second antenna and during a second block in the transmission frame the fourth symbol sequence to the first antenna and the third symbol sequence to the first antenna.

4. A method of trasmitting a signal of the type comprising a sequence of symbols over spaced antennas, or antennas of different polarization, to reduce fading and intersymbol interference, comprising the steps of:

dividing a transmission frame into first and second blocks;
processing the sequence of symbols to generate first, second, third and fourth symbol sequences so that some of the symbols in at least one of the symbol sequences are time-reversed, some of the symbols in at least one of the symbol sequences are negated, the third symbol sequence corresponding to the first symbol sequence and the fourth symbol sequence corresponding to the second symbol sequence; and
during the first block of the transmission frame, applying the first symbol sequence to a first antenna and the second symbol sequence to a second antenna and during the second block of the transmission frame applying the fourth symbol sequence to the first antenna and the third symbol sequence to the second antenna;
the processing of the sequence of symbols further comprises dividing the sequence of symbols to obtain the first and the second symbol sequences, processing the first symbol sequence to obtain the third symbol sequence, and processing the second symbol sequence to obtain the fourth symbol sequence;
the processing of the second symbol sequence comprises time reversing, complex conjugating and negating the second symbol sequence to generate the fourth symbol sequence; and
the processing of the first symbol sequence comprises time reversing and complex conjugating the first symbol sequence to generate the third symbol sequence.

5. The method of claim 4 wherein the first and second antennas are replaced by respectively ones of a first and a second groups of antennas, each group comprising a plurality of antennas that are spaced from each other, or differently polarized with respect to each other, wherein the step of applying the first symbol sequence to the first antenna and the second symbol sequence to the second antenna during the first transmission block is replaced by the step of transmitting the first symbol sequence from the first group of antennas during the first transmission block using a delay diversity technique and transmitting the second symbol sequence from the second group of antennas during the first transmission block using a delay diversity technique; and wherein the step of applying the fourth symbol sequence to the first antenna during the second transmission block and applying the third symbol sequence to the second antenna is replaced by the step of transmitting from the first group of antennas using a delay diversity technique during the second transmission block the fourth symbol sequence, and transmitting from the second group of antennas using a delay diversity technique the third symbol sequence.

6. The method of claim 5 wherein the first and second groups of antennas are spaced away from each other or have different polarizations with respect to each other.

7. A method of transmitting a signal of the type comprising a sequence of symbols over spaced antennas, or antennas of different polarization, to reduce fading and intersymbol interference, comprising the steps of:

dividing a transmission frame into first and second blocks;
processing the sequence of symbols to generate first, second, third, and fourth symbol sequences so that some of the symbols in at least one of the symbol sequences are time-reversed, some of the symbols in at least one of the symbol sequences are compex conjugated, and some of the symbols in at least one of the symbol sequences are negated, the third symbol sequence corresponding to the first symbol sequence and the fourth symbol sequence corresponding to the second symbol sequence; and
during the first block of the transmission frame, applying the first symblol sequence to a first antenna and the second symbol sequence to a second antenna and during the second block of the transmission frame applying the fourth symbol sequence to the first antenna and the third symbol sequence to the second antenna;
the processing of the sequence of symbols further comprises dividing the sequence of symbols to obtain the first and the second symbol sequneces, processing the first symbol sequence to obtain the third symbol sequence, and processing the second symbol sequence to obtain the fourth symbol sequence;
the dividing of sequence of symbols further comprises assigning symbols to the first symbol sequence and to the second symbol sequence such that there is an equal amount of symbols in each of the first and second symbol sequences and that correlation between symbols close to each other in each of the first and second symbol sequences is not significantly effected.

8. The method of claim 7 wherein the step of dividing the sequence of symbols further comprises the step of assigning at least one training symbol, which is a non-data part of the signal, to each of the first and the second symbol sequences.

9. The method of claim 8 wherein the step of assigning at least one training symbol to each of the first and the second symbol sequences further comprises the step of assigning a number of training symbols equal to an anticipated delay spread to each of a beginning and an end of each of the first and the second symbol sequences.

10. A system for transmitting data while reducing the effects of fading and handling intersymbol interference efficiently comprising:

a first antenna and a second antenna; and
an encoder coupled to the first and second antennas and adapted to divide a signal into a first and a second symbol stream, each symbol stream having a plurality of symbols, the encoder adapted to transmit the first symbol stream through the first antenna during a first block of a transmission frame, to transmit the second symbol stream through the second antenna during the first block of the transmission frame, to transmit through the second antenna a time reversed and complex conjugate form of the first symbol stream during a second block of the transmission frame, and to transmit through the first antenna a time reversed, complex conjugate and negated form of the second symbol stream during the second block of the transmission frame.

11. The system of claim 10 wherein each symbol has a symbol value and the encoder is further adapted to assign the symbols of the signal to each of the first symbol stream and the second symbol stream such that there is an equal amount of symbols in each of the first and second symbol streams.

12. The system of claim 10 wherein the encoder is further adapted to assign at least one training symbol, which is a non-data part of the signal, to each of the first and second symbol streams.

13. The system of claim 10 wherein the encoder is further adapted to assign a number of training symbols, which is a non-data part of the signal, equal to a delay spread to each of a beginning and an end of each of the first and the second symbol streams.

14. A system for transmitting data while reducing the effects of fading and handling intersymbol interference effectively comprising:
a first antenna group and a second antenna group, each group comprising a plurality of antennas; and
an encoder coupled to the first and second antenna groups and adapted to divide a signal into a first and a second symbol streams, each symbol stream having a plurality of symbols, the encoder adapted to transmit the first symbol stream through the first antenna group using a delay diversity technique during a first block of a frame, to transmit the second symbol stream through the second antenna group using a delay diversity technique during the first block of the frame, to transmit through the second antenna group a time reversed and complex conjugate form of the first symbol stream during a second block of the frame, and to transmit through the first antenna group a time reversed, complex conjugate and negated form of the second symbol stream during the second block of the frame.

15. The system in claim 14 wherein the antennas within each group are spaced apart from one another.

16. The system in claim 15 further comprises:
a first and a second antenna within the first antenna group; and
the encoder is further adapted to use a delay diversity technique wherein the first symbol stream is transmitted from the first antenna and after a delay period the first symbol stream is transmitted from the second antenna.

17. The system of claim 14 wherein each symbol has a symbol value and the encoder is further adapted to assign the symbols of the signal to each of the first symbol stream and the second symbol stream such that there is an equal amount of symbols in each of the first and second symbol streams.

18. The system of claim 17 wherein the encoder is further adapted to assign at least one training symbol, which is a non-data part of the signal, to each of the first and second symbol streams.

19. The system of claim 18 wherein the encoder is further adapted to assign a number of training symbols, which is a non-data part of the signal, equal to an anticipated delay spread to each of a beginning and an end of each of the first and the second symbol streams.

20. The system in claim 14 wherein the antennas within each group have polarizations different from one another.

21. A method of transmitting a signal having a sequence of symbols through at least one channel with intersymbol interference, comprising the steps of:
dividing the sequence of symbols to form a plurality of symbol streams, wherein dividing the sequence of symbols comprises assigning symbols in the sequence of symbols to a first symbol stream and a second symbol stream such that there is an equal amount of symbols in each of the first and second symbol streams and that correlation between symbols close to each other in each of the first and second symbol streams is not significantly effected; and
processing the plurality of symbol streams before transmitting each symbol stream through a channel, wherein processing the plurality of symbol streams comprises time-reversing at least one of the symbol streams before transmitting the at least one of the processed symbol streams.

22. A transmitter for transmitting signals of the type comprising a sequence of symbols over spaced antennas, or antennas of different polarization, to reduce fading while handling intersymbol interference efficiently, comprising:
a processor for processing the sequence of symbols (i) to generate first, second, third, and fourth symbol sequences so that some of the symbols in at least one of the symbol sequences are time-reversed, some of the symbols in at least one of the symbol sequences are complex conjugated, some of the symbols in at least one of the symbol sequences are negated, the third sequence corresponding to the first sequence and the fourth sequence corresponding to the second sequence; (ii) to divide the sequence of symbols to obtain the first and the second symbol sequences, and for processing the first symbol sequence to obtain the third symbol sequence, and for processing the second symbol sequence to obtain the fourth symbol sequence; and (iii) for processing the second symbol sequence including time reversing, complex conjugating and negating the second symbol sequence to generate the fourth symbol sequence, and for processing the first symbol sequence including time reversing and complex conjugating the first symbol sequence to generate the third symbol sequence; and
means for applying during a first block of a transmission frame the first symbol sequence to a first antenna and the second symbol sequence to a second antenna and during a second block in the transmission frame the fourth symbol sequence to the first antenna and the third symbol sequence to the first antenna.

23. A transmitter for transmitting signals of the type comprising a sequence of symbols over spaced antennas, or antennas of different polarization, to reduce fading while handling intersymbol interference efficiently, comprising:
a processor for processing the sequence of symbols (i) to generate first, second, third, and fourth symbol sequences so that some of the symbols in at least one of the symbol sequences are time-reversed, some of the symbols in at least one of the symbol sequences are complex conjugated, some of the symbols in at least one of the symbol sequences are negated, the third sequence corresponding to the first sequence and the fourth sequence corresponding to the second sequence; (ii) to divide the sequence of symbols to obtain the first and the second symbol sequences, and for processing the first symbol sequence to obtain the third symbol sequence, and for processing the second symbol sequence to obtain the fourth symbol sequence; and the dividing of the sequence of symbols further includes assigning symbols to the first symbol sequence and to the second symbol sequence such that there is an equal amount of symbols in each of the first and second symbol sequences and that correlation between symbols close to each other in each of the first and second symbol sequences is not significantly effected; and
means for applying during a first block of a transmission frame the first symbol sequence to a first antenna and the second symbol sequence to a second antenna and during a second block in the transmission frame the fourth symbol sequence to the first antenna and the third symbol sequence to the first antenna.

* * * * *